(12) United States Patent
Xu et al.

(10) Patent No.: US 12,063,107 B1
(45) Date of Patent: Aug. 13, 2024

(54) METHOD AND SYSTEM OF A TIME-FREQUENCY DIVISION MULTIPLEXED SIGNAL RECEIVER

(71) Applicant: CABLE TELEVISION LABORATORIES, INC., Louisville, CO (US)

(72) Inventors: Mu Xu, Broomfield, CO (US); Zhensheng Jia, Superior, CO (US); Haipeng Zhang, Broomfield, CO (US); Luis Alberto Campos, Superior, CO (US)

(73) Assignee: Cable Television Laboratories, Inc., Louisville, CO (US)

( * ) Notice: Subject to any disclaimer, the term of this patent is extended or adjusted under 35 U.S.C. 154(b) by 45 days.

(21) Appl. No.: 17/949,974

(22) Filed: Sep. 21, 2022

Related U.S. Application Data

(60) Provisional application No. 63/246,690, filed on Sep. 21, 2021.

(51) Int. Cl.
*H04J 4/00* (2006.01)
*H04L 5/26* (2006.01)

(52) U.S. Cl.
CPC ............... *H04J 4/005* (2013.01); *H04L 5/26* (2013.01)

(58) Field of Classification Search
CPC .................................. H04J 4/005; H04L 5/26
See application file for complete search history.

(56) References Cited

U.S. PATENT DOCUMENTS

| | | | |
|---|---|---|---|
| 8,086,104 B2 | 12/2011 | Suvakovic | |
| 10,298,318 B1 | 5/2019 | Jiang | |
| 11,265,099 B1 | 3/2022 | Zhang et al. | |
| 11,695,493 B1 | 7/2023 | Zhang et al. | |
| 2006/0133811 A1 | 6/2006 | Gumaste et al. | |
| 2009/0003493 A1* | 1/2009 | Gunturi | H04L 27/2657 375/344 |
| 2012/0141135 A1 | 6/2012 | Yang et al. | |

(Continued)

FOREIGN PATENT DOCUMENTS

| | | |
|---|---|---|
| CN | 102859957 A | 1/2013 |
| EP | 2670103 A1 | 12/2013 |

(Continued)

OTHER PUBLICATIONS

U.S. Appl. No. 17/682,599, filed Feb. 28, 2021, Junwen Zhang, Entire Document.

(Continued)

*Primary Examiner* — Hoang-Chuong Q Vu
(74) *Attorney, Agent, or Firm* — Cozen O'Connor

(57) ABSTRACT

A method for extracting a plurality of data streams from a time-frequency division multiplexed (TFDM) signal includes determining a plurality of sub-channels of the TFDM signal, where each of the plurality of sub-channels has a respective one of a plurality of frequency ranges. The method also includes down-converting, based on the plurality of frequency ranges, the TFDM signal into a plurality of down-converted signals, where each down-converted signal corresponds to a respective one of the plurality of sub-channels. The method also includes extracting the plurality of data streams from a respective one of the plurality of down-converted signals.

19 Claims, 13 Drawing Sheets

(56) References Cited

U.S. PATENT DOCUMENTS

| | | | |
|---|---|---|---|
| 2012/0155373 A1* | 6/2012 | Yokomakura | H04B 7/15521 |
| | | | 370/315 |
| 2012/0263481 A1 | 10/2012 | Ip et al. | |
| 2012/0294614 A1 | 11/2012 | Cvijetic et al. | |
| 2013/0329830 A1* | 12/2013 | Yokomakura | H04L 1/0071 |
| | | | 375/295 |
| 2014/0094130 A1* | 4/2014 | Elenes | H04B 7/0845 |
| | | | 455/132 |
| 2015/0139348 A1* | 5/2015 | Tong | H04B 1/0053 |
| | | | 375/267 |
| 2018/0321358 A1* | 11/2018 | Carswell | G01S 7/282 |

FOREIGN PATENT DOCUMENTS

| | | |
|---|---|---|
| EP | 3316499 A1 | 5/2018 |
| JP | 2006074765 A | 3/2006 |
| WO | 2018227624 A1 | 12/2018 |
| WO | 2019010649 A1 | 1/2019 |

OTHER PUBLICATIONS

U.S. Appl. No. 18/217,582, filed Jul. 2, 2023, Junwen Zhang, Entire Document.

Jia, Steve, et al., "100G Single-Wavelength Passive Optical Network—Coherent PON," CableLabs, CPON Webinar, Apr. 2021.

Zhang, Junwen, et al., "Rate-flexible single-wavelength TFDM 100G coherent PON based on digital subcarrier multiplexing technology," Porc. OFC 2020, paper W1E.5.

* cited by examiner

METHOD AND SYSTEM OF A TIME-FREQUENCY DIVISION MULTIPLEXED SIGNAL RECEIVER

CROSS-REFERENCE TO RELATED APPLICATIONS

This application claims to the benefit of U.S. Provisional Patent Application No. 63/246,690, filed on Sep. 21, 2021, the disclosure of which is incorporated herein by reference in its entirety.

BACKGROUND

Coherent passive optical networks (CPON) offer high receiver sensitivity, large optical link budget, and robustness against chromatic dispersion, making them a promising future broadband solution. In a traditional CPON, data multiplexing typically requires a single-carrier approach using time-division multiplexing (TDM). While single-carrier TDM is a mature technology and has been widely used in legacy PONs, it faces a challenge that includes (i) high scheduling latency when connecting an ultra-large number of optical network units (ONUs), and (ii) insufficient flexibility to simultaneously support high-bandwidth and low-latency services.

SUMMARY

The present embodiments include a method for data multiplexing by having multiple digital subcarriers and multiplexing data on additional frequency dimensions. The method includes channel recognition and frequency calibration in time frequency division multiplexing (TFDM) based CPON upstream. The method is based on power rebalancing and sub-channel recognition that includes frequency domain power detection and channel boundary search. The method achieves high reliability and a large frequency offset estimation range when compared to traditional approaches.

In a first aspect, a method for extracting a plurality of data streams from a time-frequency division multiplexed (TFDM) signal includes determining a plurality of sub-channels of the TFDM signal, where each of the plurality of sub-channels has a respective one of a plurality of frequency ranges. The method also includes down-converting, based on the plurality of frequency ranges, the TFDM signal into a plurality of down-converted signals, where each down-converted signal corresponds to a respective one of the plurality of sub-channels. The method also includes extracting the plurality of data streams from a respective one of the plurality of down-converted signals.

In a second aspect, a burst receiver includes a coherent receiver, a processor, and a memory. The coherent receiver receives a TFDM signal. The processor is communicatively coupled to the coherent receiver. The memory stores computer-readable instructions that, when executed by the processor, cause the processor to extract a plurality of data streams from the TFDM signal by (i) determining a plurality of sub-channels of the TFDM signal, where each of the plurality of sub-channels has a respective one of a plurality of frequency ranges, (ii) down-converting, based on the plurality of frequency ranges, the TFDM signal into a plurality of down-converted signals, where each down-converted signal corresponds to a respective one of the plurality of sub-channels; and (iii) extracting the plurality of data streams from a respective one of the plurality of down-converted signals.

DETAILED DESCRIPTION OF THE EMBODIMENTS

Figure 1A:
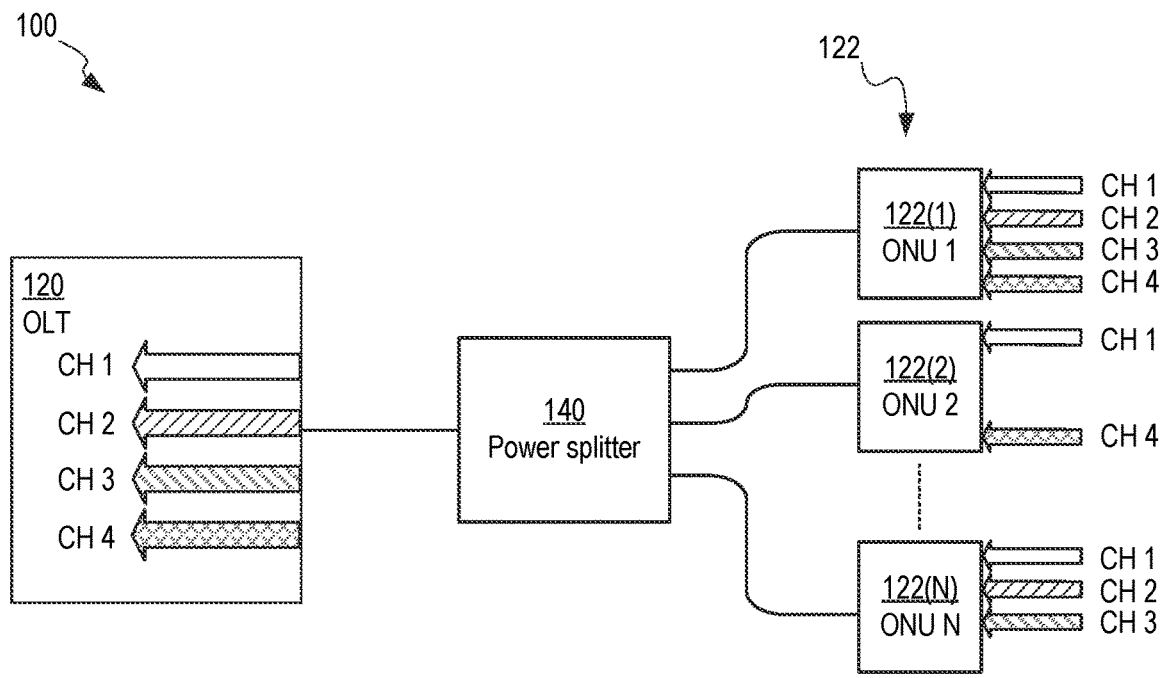
FIG. 1A is a schematic of a coherent TFDM passive optical network (PON) system, in an embodiment.

Coherent passive optical network (PON) using 100-Gbit/s ("100G" hereinafter) single-wavelength carrier is an attractive solution for next-generation optical access networks to boost the capacity and coverage. For data multiplexing 100G single carrier, conventional time-division multiplexing (TDM) is a mature solution. However, TDM faces a challenge of high scheduling latency when connecting an ultra-large number of optical network units (ONUs) and the insufficient flexibility to simultaneously support high-bandwidth and low-latency services. To overcome the challenges that TDM faces, time and frequency division multiplexing (TFDM), described in U.S. Ser. No. 11/265,099B1 filed on May 18, 2020 and entitled "System and methods for time and frequency division passive optical network", which is incorporated by reference, was introduced to provide multiple independent sub-channels, where different network services and ONU groups may be allocated with different bands without the need of contention resolutions. TFDM greatly enhances the flexibility for the coexistence of low-latency mobile and high-speed video streaming services over a converged CPON platform. The polling latency and traffic blocking rate are also greatly improved since multiple parallel scheduling pipelines are provided.

While a conventional 10-gigabit symmetrical PON (XGS-PON) connects up to 32 optical network units (ONUs), 100G single carrier increases the number of connected users to 256~512 in CPON. However, the increased number of connected users results in significantly higher latency in polling and scheduling in the media access control (MAC) layer. The polling and scheduling delay of single-carrier CPON with 512 ONUs may increase by 16 times: 16×k×250 μs, where k is the number of round trips in one polling cycle. The resulting delay is estimated to be 8~32 millisecond, which is intolerable for supporting low-latency services. With TFDM, such a latency can be greatly mitigated by scheduling the users independently in multiple sub-channel pipelines (or ONU grouping). Moreover, the TFDM also brings extra flexibility to support network slicing by allocating different bands for different services. For example, one of its sub bands may be used dedicatedly as low-latency transmission without disturbing other regular services.

However, TFDM also brings some technical challenges. One challenge comes from the burst detection in TFDM upstream. Unlike conventional TDM PON, where the burst can be detected by locating the power envelope in time domain, the burst of TFDM may contain multiple signals from different sub-channels with different power levels. The multiple signals are mixed and require an extra step to recognize how many sub-channels are included and from which ONU each sub-channel originates. Additionally, in conventional TDM burst receivers, to optimize the performance and fully utilize the dynamic range of analog-to-digital converter (ADC), automatic-gain control (AGC) is implemented in trans-impedance amplifier (TIA) to monitor and adjust the burst power. However, adjusting the burst power is difficult to implement in TFDM because the signal components distributed in multiple sub-channels are mixed in time domain. Consequently, instead of passively adjusting the received power, some proactive mechanism may be designed to balance the burst power at the transmitter site.

Additionally, at each ONU, an independently operated laser diode introduces random frequency drifts up to a few GHz, detuning the signal from the original sub-channel window and causing failure of the conventional carrier frequency offset (CFO)-estimation algorithms. Thus, the carrier frequency of the sub-channels must be precisely estimated before digital down conversion. To overcome these challenges, methods for channel detection and frequency-window rectification are described herein for TFDM based CPON burst receiver. With these methods, the burst receiver may efficiently differentiate the sub-channels from mixed signal, and the system tolerance for CFO is significantly increased for each sub-channel in the coherent detection process.

FIG. 1A is a schematic of a coherent TFDM PON system 100. The PON system 100 includes an optical line terminal (OLT) 120, a power splitter 140, and ONUs 122. ONUs 122 includes up to N ONUs: ONU 1 122(1) to ONU N 122(N). In the example implementation of TFDM PON system shown in FIG. 1A, the uplink transmission includes four sub-channels: CH 1 to CH 4. Each ONU 122(i), where i is a positive integer up to N, may use any number of available sub-channels. For example, ONU 1 112(1) uses all four sub-channels while ONU 2 122(2) uses sub-channels CH 1 and CH 4 for uplink transmission.

Figure 1B:
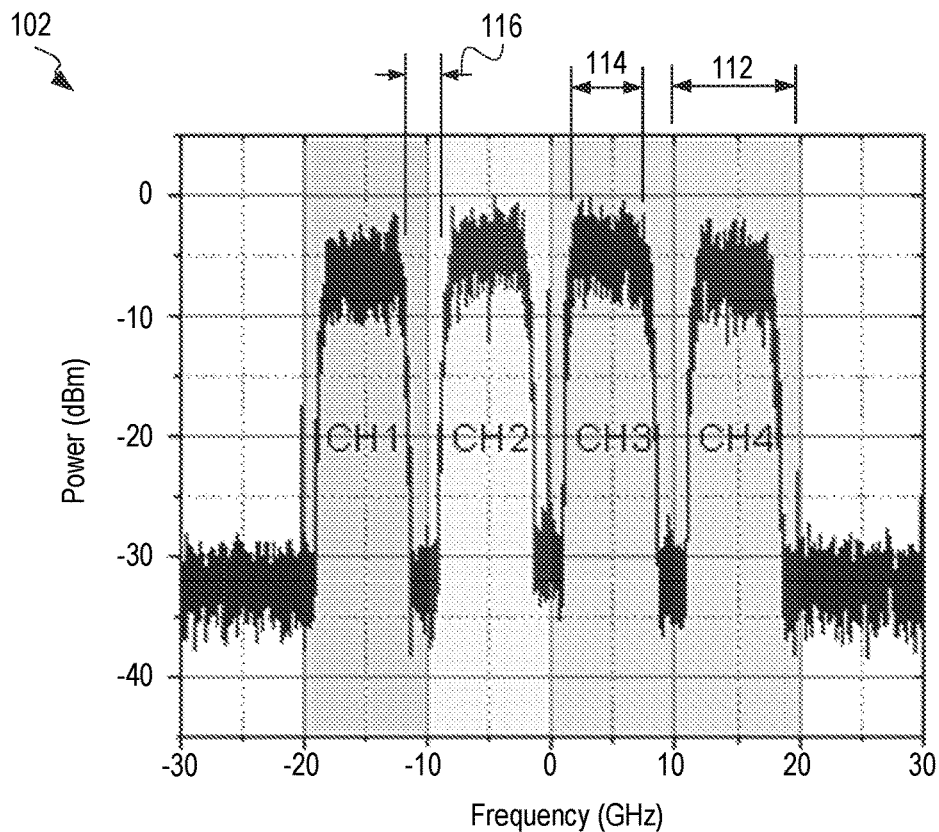
FIG. 1B is an example signal spectrum showing the four sub-channels in the TFDM PON system of FIG. 1A.

FIG. 1B is an example signal spectrum 102 showing four sub-channels in TFDM PON system 100. Each sub-channel occupies a 10-GHz window 112 with 6.25-GHz bandwidth 114 centered at −15, −5, +5, and +15 GHz. Signal spectrum 102 also shows a guard band 116 of 3.75 GHz reserved between adjacent sub-channels. Modulated by 25-Gbit/s dual-polarization (DP) quadrature phase shift keying (QPSK) signal in each channel, the total uplink data rate reaches 100 Gbit/s. Depending on the bandwidth demand, service requirements, or hardware options, each ONU 122 (i), may use one to four sub-channels with the data rate varying from 25 to 100 Gbit/s with a balance in capacity and power budget. While the example shown in FIG. 1B has four sub-channels of 25 Gbits/s with a total data rate of 100 Gbits/s, the total data rate may be higher or lower than 100 Gbits/s, and/or the total number of sub-channels may be any positive integer without departing from the scope of this disclosure.

Figure 1C:
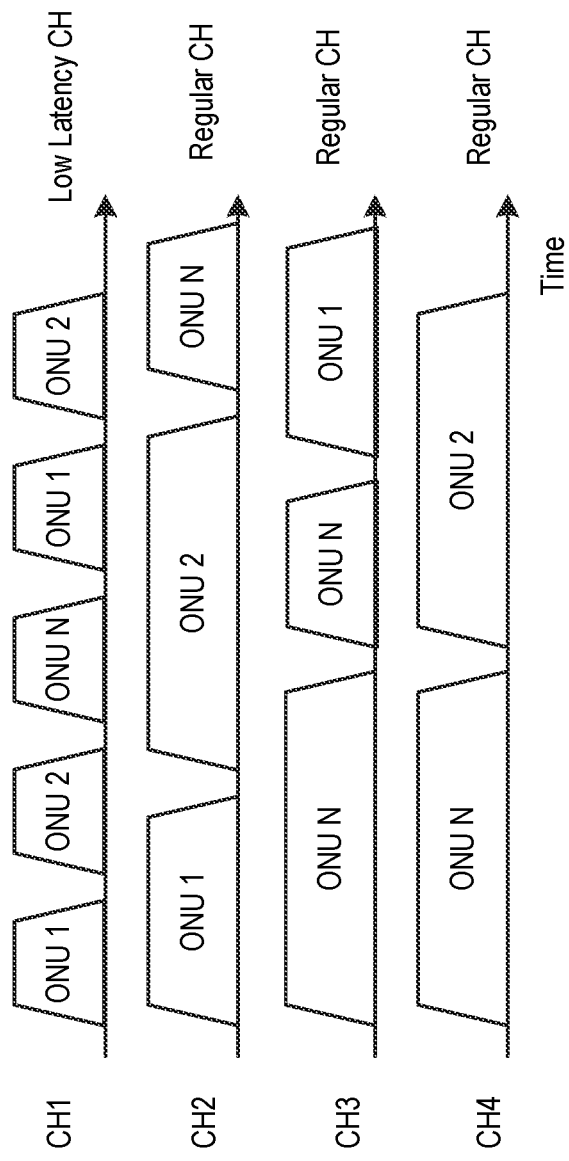
FIG. 1C shows an example burst distribution under operation of TFDM PON system of FIG. 1A.

FIG. 1C shows an example burst distribution under operation of TFDM PON system 100. The burst distribution from different ONUs is dynamically allocated in different sub-channels, leading to a highly flexible architecture. For example, to accommodate the low-latency services with minimal interruptions to the normal service, one of the sub-channels can be configured (e.g., CH 1 in FIG. 1C) to allow consecutive short bursts with reduced average data queueing time.

Figure 2:
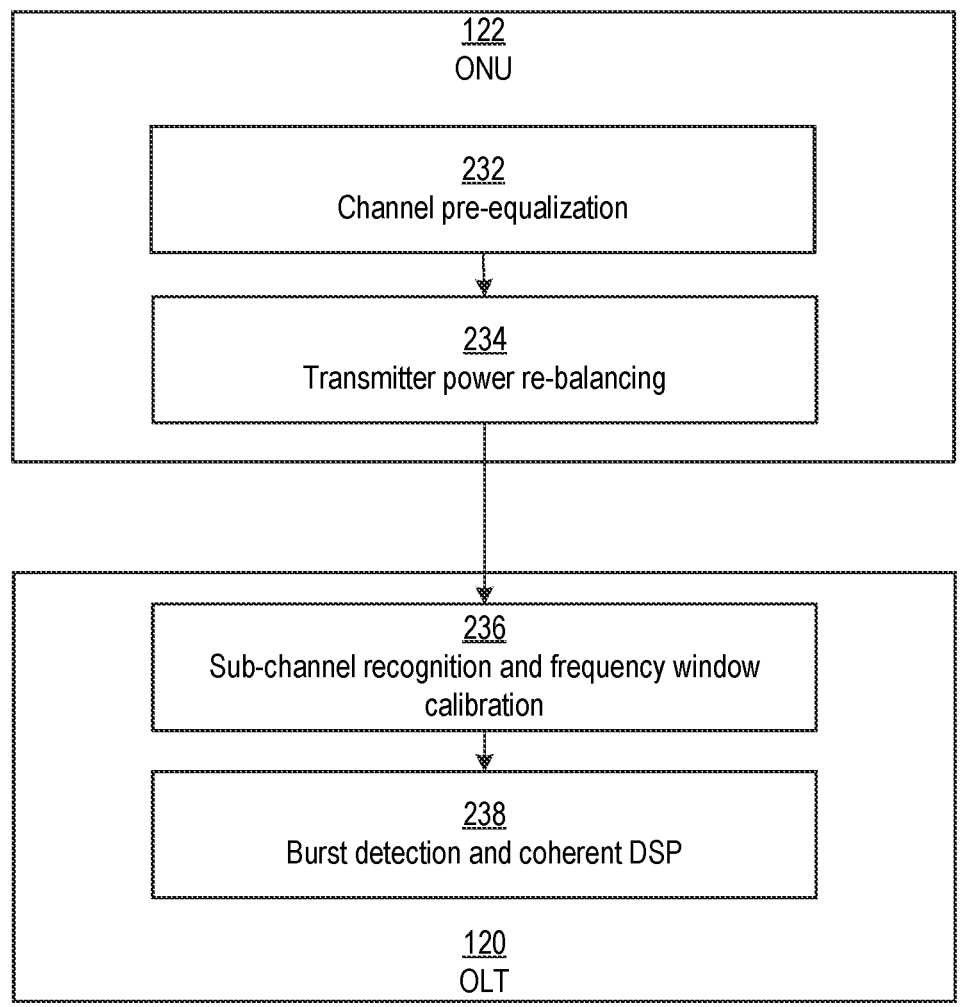
FIG. 2 is a block diagram of a TFDM PON that illustrate key hardware of ONU and OLT of FIG. 1A.

FIG. 2 is a block diagram of a TFDM PON 200 that illustrate key hardware of ONU 122 and OLT 120 of FIG. 1A. Functions of the key hardware shown in FIG. 2 may also be performed by one or more processors. TFDM PON 200 is an example of TFDM PON system 100. ONU 122 includes a hardware 232 that performs channel pre-equalization and a hardware 234 re-balances transmitter power. OLT 120 includes a hardware 236 that performs sub-channel recognition and frequency window calibration (CR-FC) and a hardware 238 that performs burst detection and coherent digital signal processing (DSP). The ONU transmitter initialization, including channel pre-equalization and power rebalancing, may compensate the power difference of received bursts thus improving the fairness and better utilizing the quantization range of ADC. The channel recognition algorithm detects the active sub-channels on a large range, estimates and calibrates its channel frequency windows, and thus detects dynamic burst.

Figure 3A:
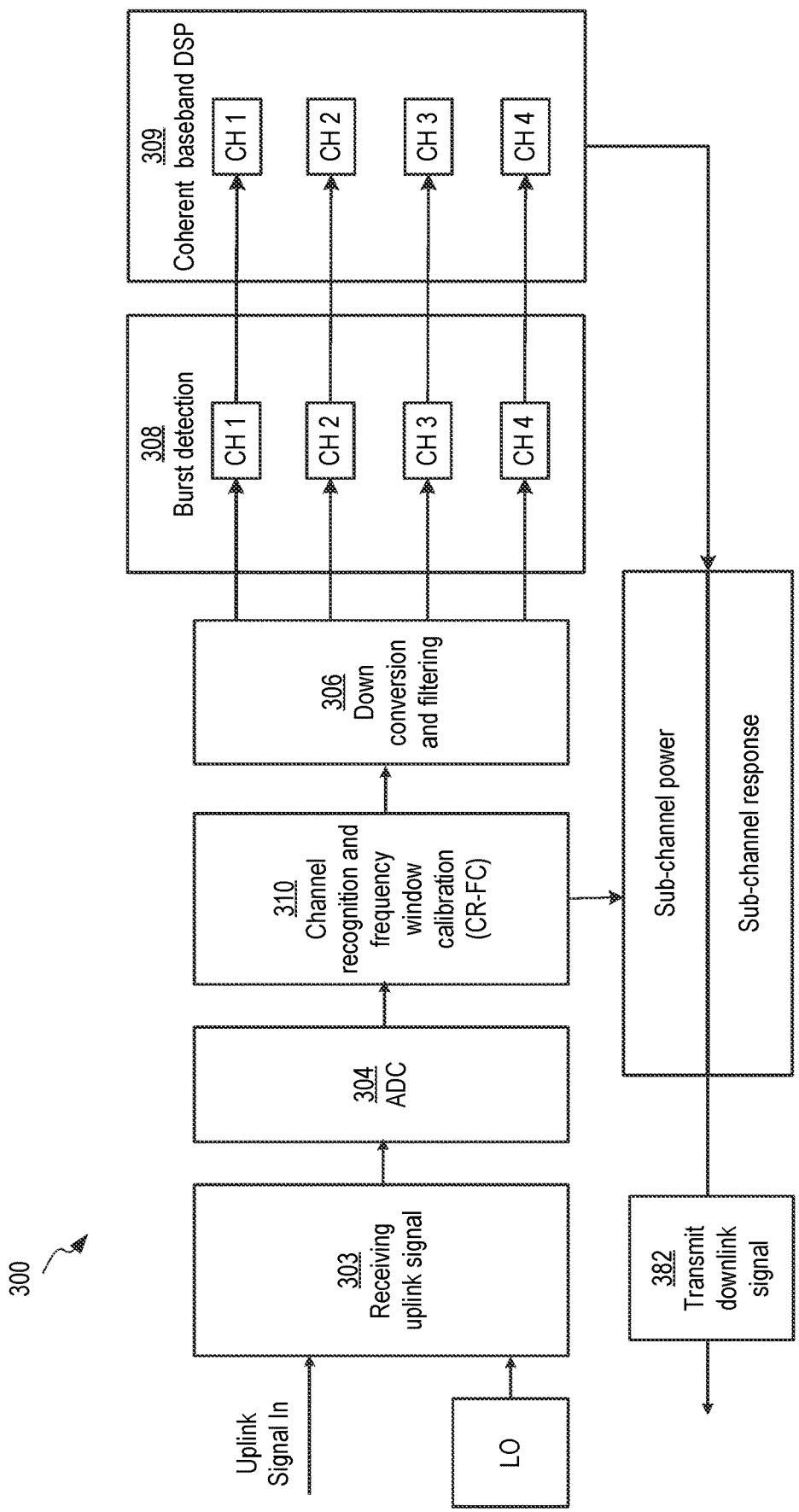
FIG. 3A is a schematic of a signal recovery procedure of a coherent PON TFDM burst receiver that implements channel recognition and frequency window calibration (CR-FC), in an embodiment.
Figure 3B:
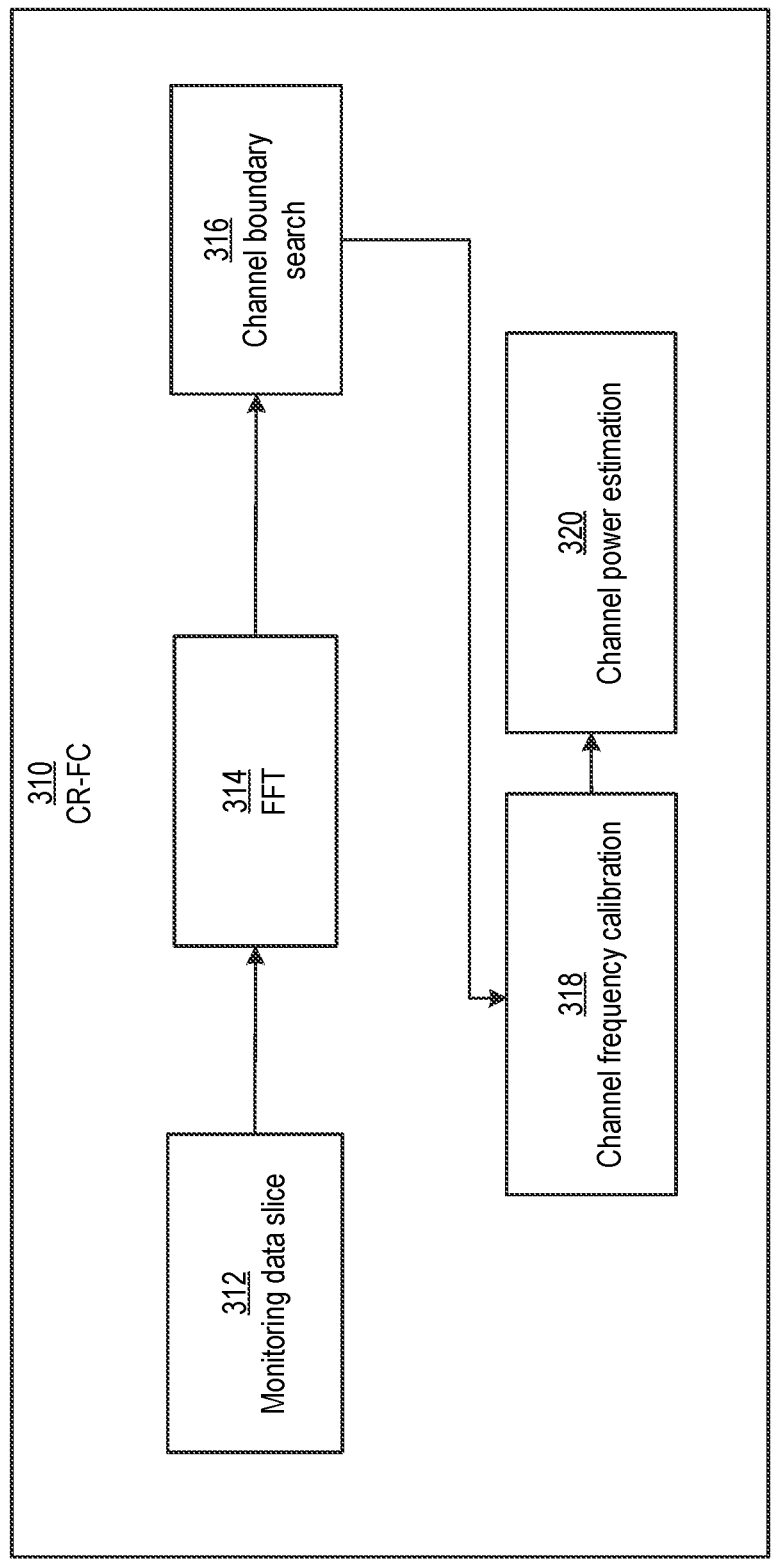
FIG. 3B is a detailed schematic of the CR-FC step of FIG. 3A.
Figure 4:
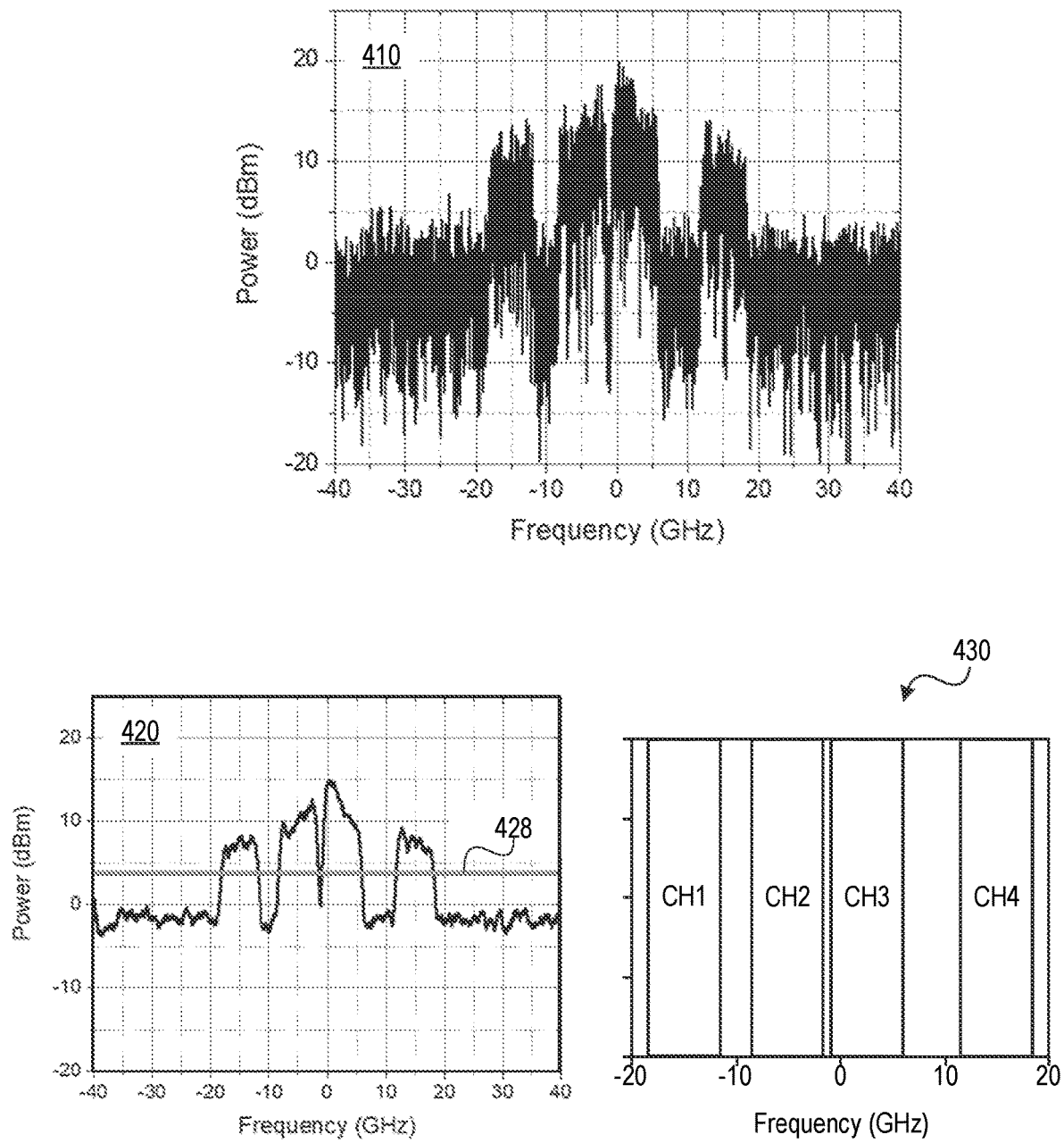
FIG. 4 shows example plots that accompany the description of the steps of FIG. 3B.
Figure 5:
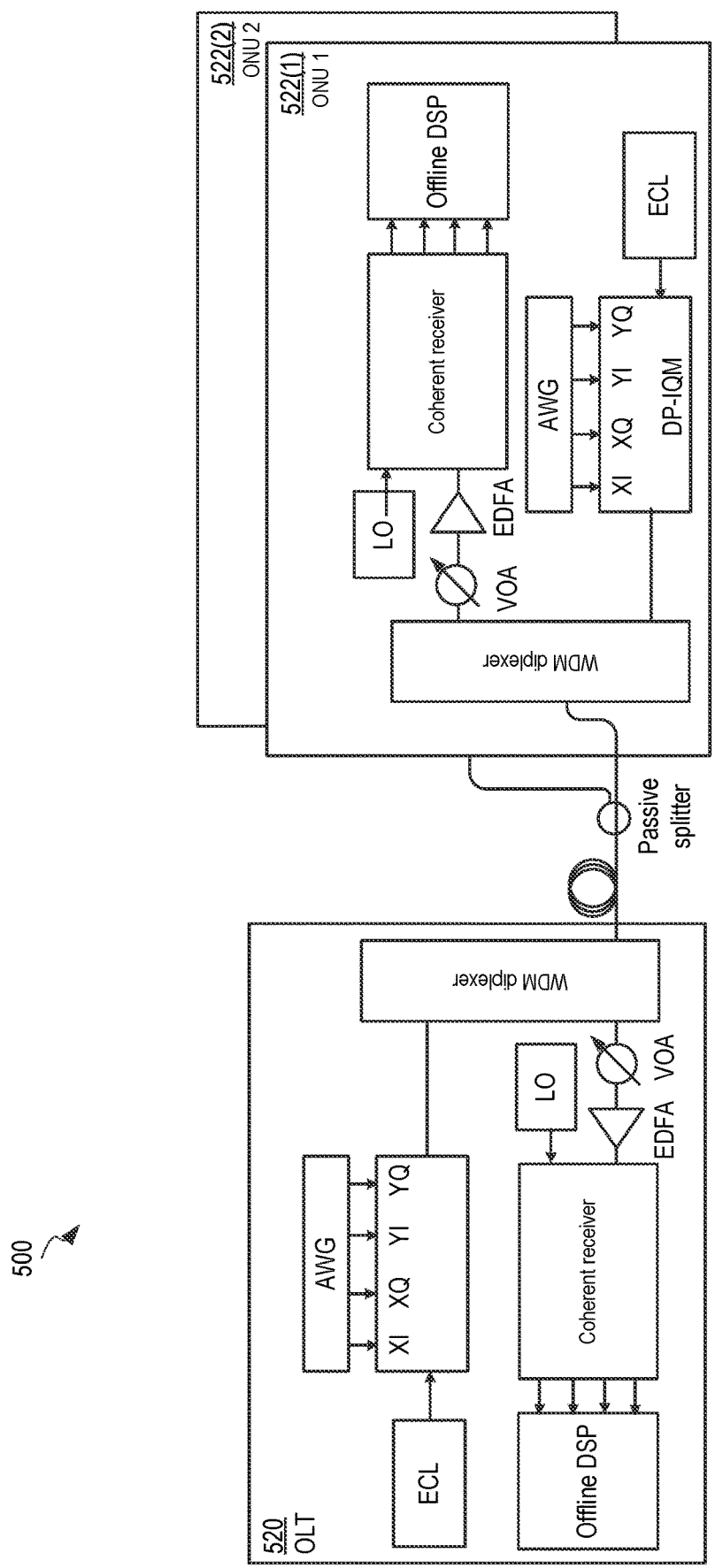
FIG. 5 illustrates a CPON TFDM burst receiver system that implements the signal recovery procedure of FIG. 3A.

FIG. 3A is a schematic of a signal recovery procedure 300 of a CPON TFDM burst receiver that implements channel recognition and frequency window calibration (CR-FC). The signal recovery procedure 300 includes steps 303, 304, 310, 306, 308, and 309. An example of a corresponding hardware for the burst receiver is shown in FIG. 5. Step 303 receives an uplink signal using a coherent receiver. Any of the steps 304, 310, 306, 308 and 309 may be performed by a processor, The CR-FC step 310 is performed between ADC step 304 and sub-channel down conversion step 306. FIG. 3B is a detailed schematic of the CR-FC step 310 of FIG. 3A. The CR-FC step includes steps 312, 314, 316, 318, and 320. For clarity of description, FIG. 4 shows example plots 410, 420, and 430 that accompany the description of the steps of FIG. 3B. FIGS. 3A, 3B and 4 are best viewed together in the following description.

The first step 312 of CR-FC is to periodically extract data samples from a received stream with the data samples forming a monitoring data slice. In step 314, Fast Fourier transform (FFT) converts the data slice into the frequency domain. Plot 410 shows a frequency spectrum of an example data slice after the FFT step 314 is performed. In step 316, channel boundary search is performed. Step 316 includes smoothening the frequency spectrum of step 314. In an example of step 316, plot 420 shows the result of smoothening of plot 410. Step 316 also includes searching for channel boundaries. In an example of channel boundary search, plot 430 of a binary channel distribution map is generated with 0 and 1 indicating whether the signal components in plot 420 fall below or above, respectively, a threshold 428.

Additional rules may be applied to eliminate the outlier noisy peaks, optical carriers, and harmonics in this step. In step 318, frequency windows are calibrated, and sub-channel carrier frequencies are calculated. In step 320, the power of each channel is estimated by integrating the square of the signal absolute values within the sub-channel window. After step 306 of down conversion and baseband digital filtering, step 308 of burst detection is performed in each sub-channel to locate and synchronize the bursts before a step 309 of coherent DSP is applied to recover the payload signals.

Additionally, information including the estimated power from step 320 of CR-FC and channel response information obtained from constant modulus algorithm (CMA) may feed back to the ONU in a step 382. Step 382 transmits a downlink signal that includes the estimated power to the ONU to perform pre-equalization (Pre-EQ) and power rebalancing (PR).

Figure 6:
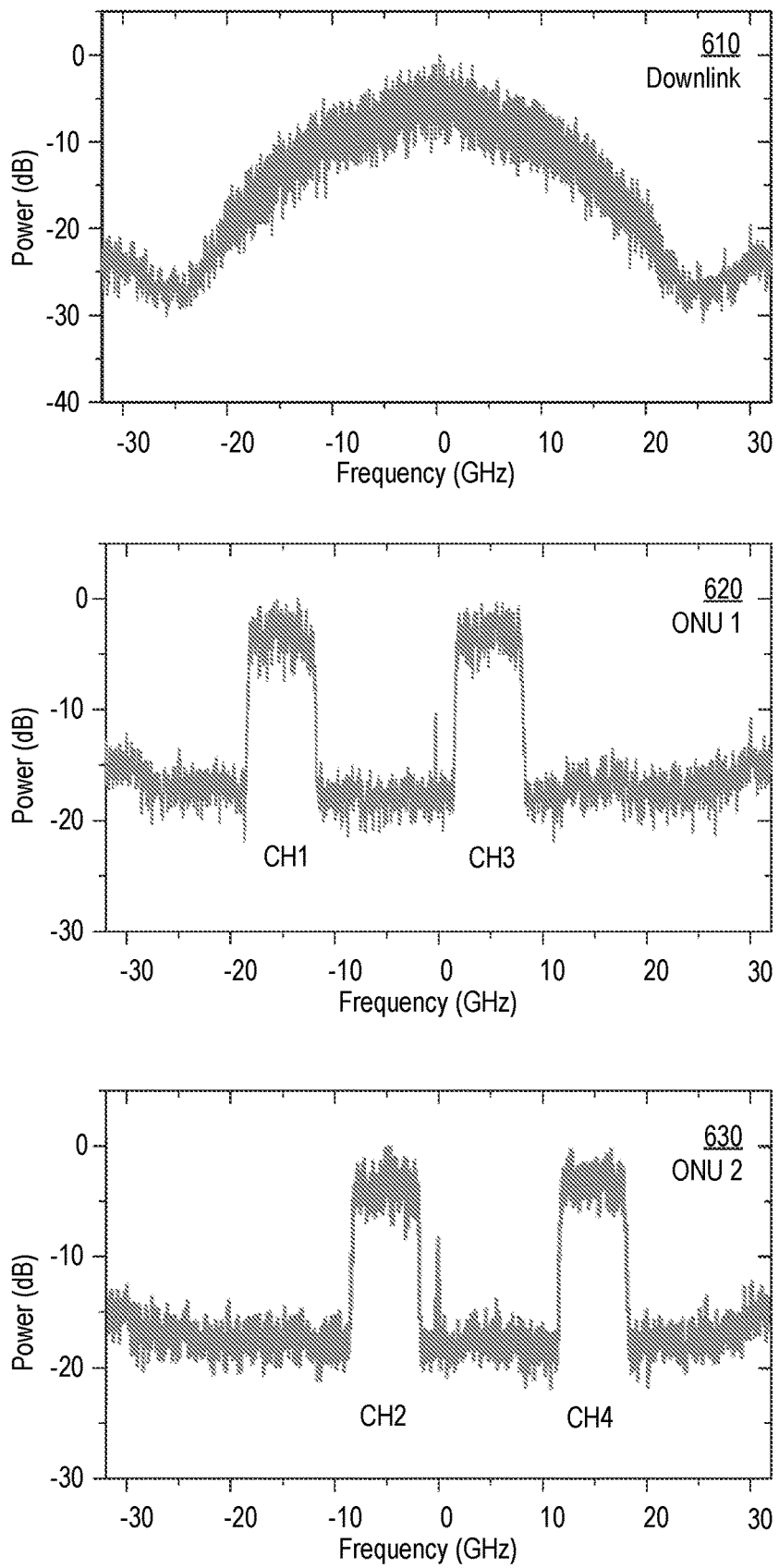
FIG. 6 shows plots that illustrate power spectra of the signals expected from TFDM burst receiver system of FIG. 5.

FIG. 5 illustrates a CPON TFDM burst receiver system 500 that implements the signal recovery procedure of FIG. 3A. System 500 includes an OLT 520 and two independently operated ONUs 522(1) and 522(2) to emulate the bidirectional point-to-multi-point transmission. OLT 520 is an example of OLT 120, and ONUs 522(1) and 522(2) are examples of ONU 122. FIG. 6 shows plots 610, 620, and 630 that illustrate power spectra of the signals expected from TFDM burst receiver system 500. For clarity, FIGS. 5 and 6 are best viewed together in the following description. In this example of a TFDM burst receiver system with four channels, the downstream is achieved by broadcasting a single-carrier 100-Gbit/s DP-QPSK signal, as shown in plot 610, from OLT 520 to ONUs 522(1) and 522(2) with the wavelength at 1565.5 nm. For the four channels in the TFDM uplink, ONU 1 522(1) is allocated with CH 1 and CH 3 as shown in plot 620. ONU2 is allocated with CH 2 and CH 4 as shown in plot 630. The two TFDM signals at each ONU are generated by two 80-GSa/s arbitrary waveform generators (AWG) and modulated onto the light through dual-polarization IQ modulators (DP-IQM) with the wavelength at 1553.3 nm. The driving voltages of the modulators are tuned and stabilized to suppress the frequency image due to IQ imbalance. At the OLT site, a homodyne coherent receiver is used to receive the combined uplink optical signal and offline DSP is applied to demodulate the data.

Figure 7:
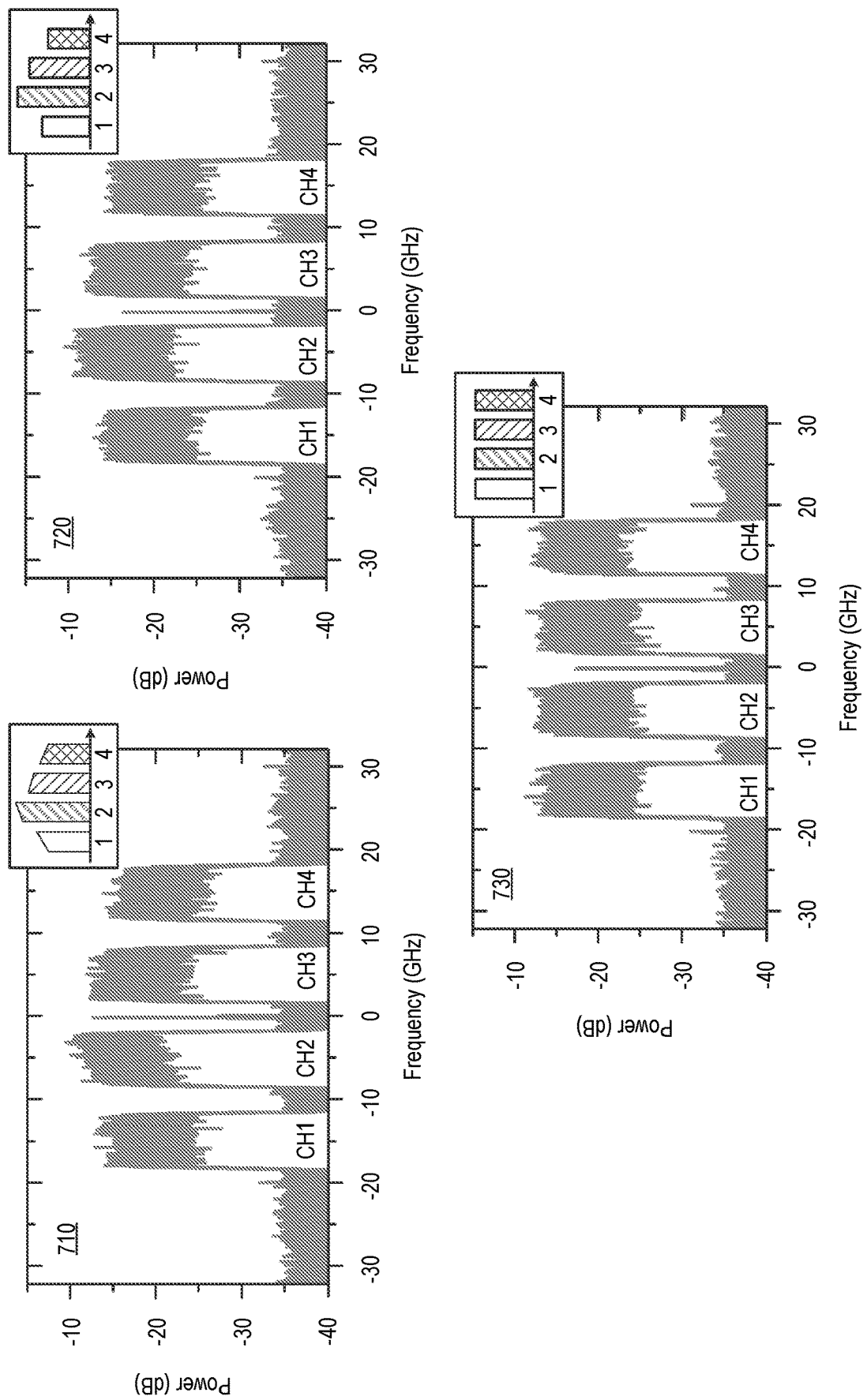
FIG. 7 shows plots illustrating the process of rebalancing and sub-channel power optimization, which may be performed as part of the system of FIG. 5.

ONUs 522(1) and 522(2) may also perform a sub-channel pre-equalization step to enable a reliable and accurate power control utilizing step 382, FIG. 3A, from OLT 520. The pre-equalization step is achieved by extracting from the downlink signal of step 382 the estimated power and the channel response information from CMA. FIG. 7 shows plots 710, 720, and 730 illustrating the process of rebalancing and sub-channel power optimization, which may be performed as part of the system 500, FIG. 5. Plots 710, 720, and 730 show the power spectra of the combined TFDM signals in the process of equalization. Inset drawings in the plots 710, 720, and 730 show exaggerated power spectra to highlight the steps. Plot 710 is a TFDM signal spectrum prior to any pre-processing. Plot 720 shows the TFDM signal spectrum after pre-equalization is applied to the spectrum of plot 710. After pre-equalization, each sub-channel signal is flattened in frequency domain. Then, based on the information of power levelling, the transmitter at each ONU adjusts its signal amplitude to achieve the fully rebalanced power distribution as shown in plot 730. Plot 730 shows the TFDM signal spectrum after power re-balancing is applied to the spectrum of plot 720.

Figure 8:
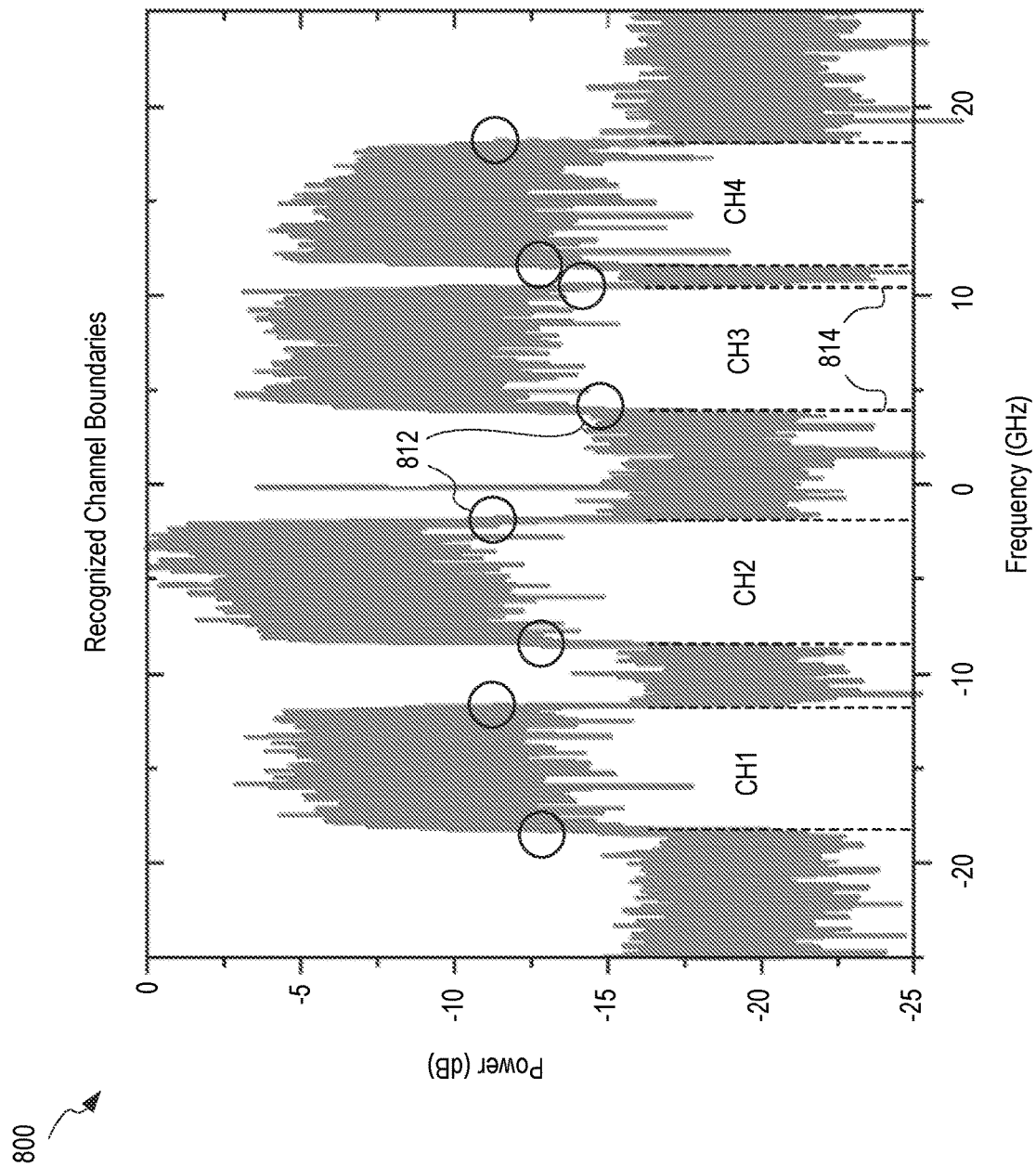
FIG. 8 is a plot showing boundaries of sub-channels recognized by CR-FC of the TFDM burst receiver system of FIG. 5 in an example TFDM spectrum.
Figure 9:
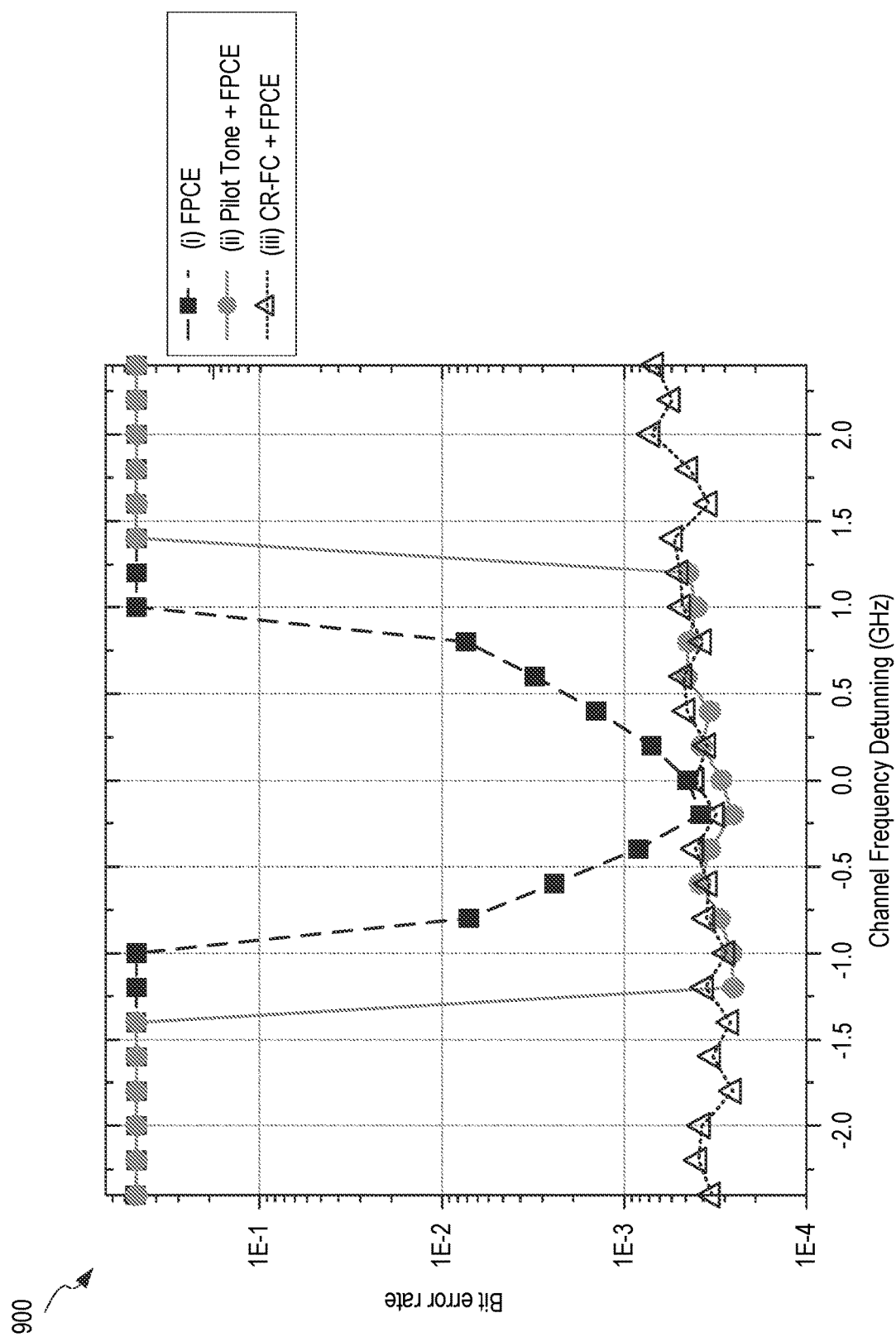
FIG. 9 is a plot comparing bit-error rate (BER) performance of the method used in the TFDM burst receiver system of FIG. 5 to other conventional methods.

For performance evaluation of CR-FC in the TFDM burst receiver system 500, FIG. 8 is a plot 800 showing boundaries of sub-channels recognized by CR-FC of the TFDM burst receiver system 500 in an example TFDM spectrum. In plot 800, sudden changes in power are recognized at points 812. The points 812 indicate the sub-channel boundaries 814. Even for difficult cases when CH 3 has drifted away from the original center frequency by 2.2 GHz, the sub-channel boundaries 814 are successfully recognized. In general, by varying the frequency detuning of CH 3 from −2.4 to +2.4 GHz, bit-error rate (BER) performance may be measured. FIG. 9 is a plot 900 comparing BER performance of the method used in the TFDM burst receiver system 500 to other conventional methods. The three methods compared in plot 900 are: (i) the conventional fourth-power carrier estimation (FPCE) at baseband (BB) DSP (e.g., coherent BB DSP step 309, FIG. 3) after down conversion; (ii) frequency-pilot-tone-based coarse CFO estimation first with inserted pilot tones at −20, −10, 10, 20 GHz, and applying FPCE in the BB DSP, and (iii) CR-FC of the TFDM burst receiver system 500 and FPCE in the BB DSP. Among the three methods, method (i), FPCE-only method, shows the worst detuning tolerance since the frequency detection range is reduced by four times due to fourth-power operation. Method (ii), pilot-tone based method, performs better than method (i), but the method fails under a larger frequency offset when the pilot tones enter the adjacent channels. Method (iii), CR-FC of TFDM burst receiver system 500, shows the best frequency-detuning tolerance because of the larger detection range covering over 75% of the 3.125-GHz frequency gap between adjacent sub-channel s.

Figure 10:
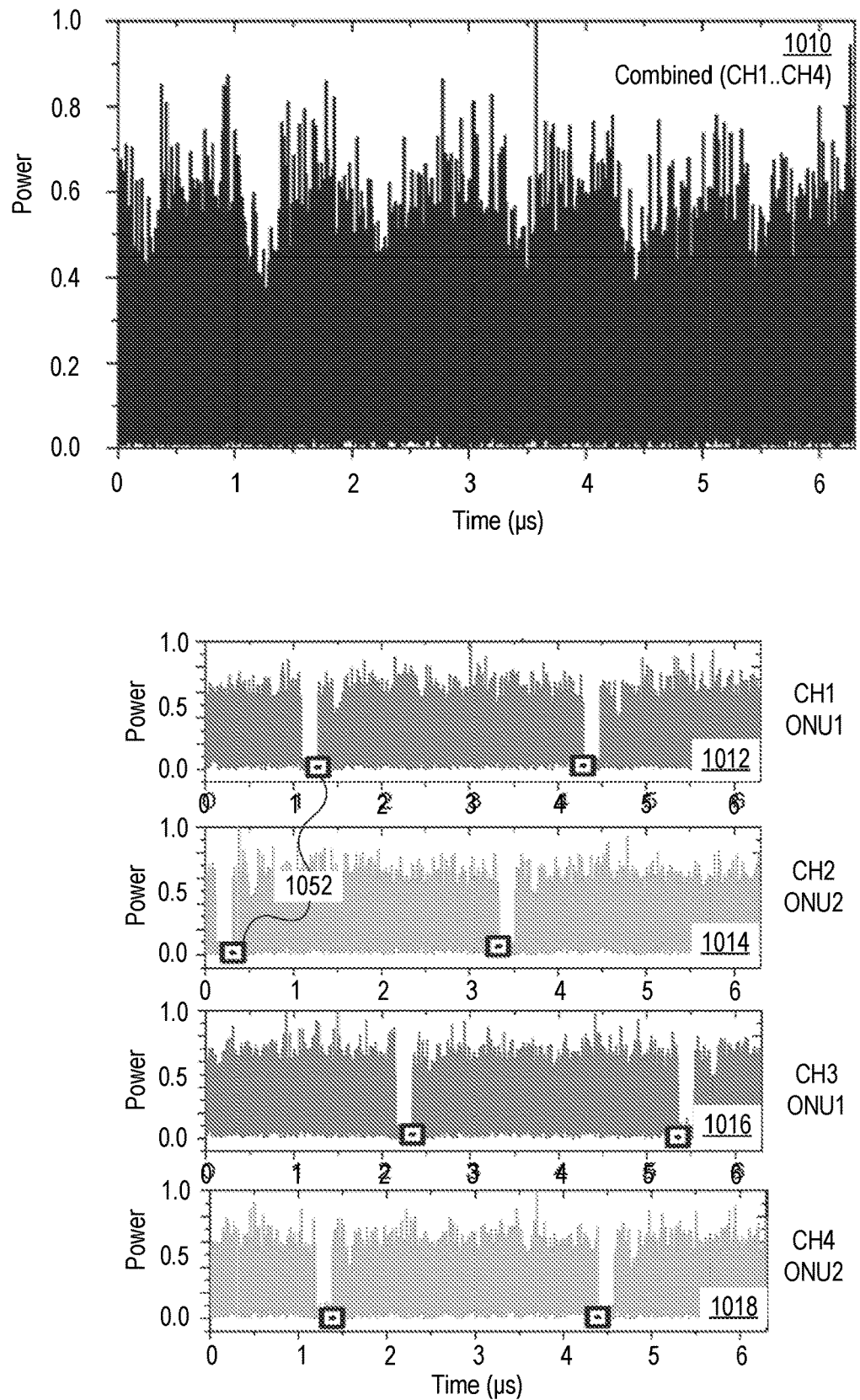
FIG. 10 shows received signal in the example of FIG. 6 in time domain.

In another example of applying the signal recovery procedure 300, FIG. 3A, in the TFDM burst receiver system 500, FIG. 10 shows received signal in the example of FIG. 6 in time domain. FIG. 10 includes plots 1010, 1012, 1014, 1016, and 1018. Plot 1010 shows a combined signal, or as received from the two ONUs 552(1) and 552(2), from all sub-channels from CH1 to CH4. In plot 1010, the asynchronous bursts in four sub-channels and two ONUs are mixed together forming a quasi-continuous-wave distribution. After the frequency windows are calibrated by CR-FC step 310, FIG. 3A, the four sub-channels, CH1, CH2, CH3, and CH4 are down converted in down conversion step 306 in respective plots 1012, 1014, 1016, and 1018. Burst power detection step 308 for each sub-channel is applied to locate the start and end point of each burst 1052 before the payload signals are demodulated by coherent BB DSP step 309.

Figure 11:
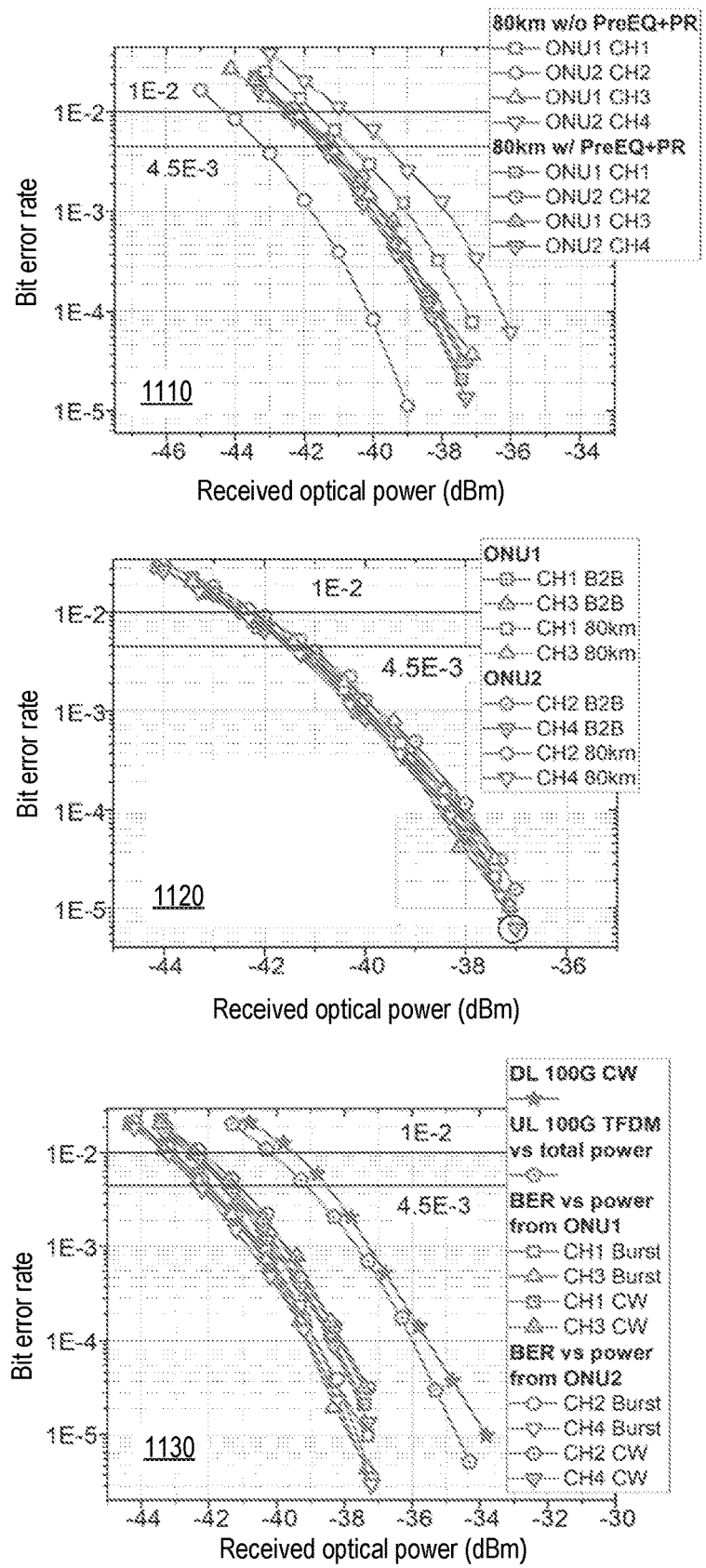
FIG. 11 shows the BER performance plots for with and without power rebalancing step in the measurement shown in FIG. 10

FIG. 11 shows the BER performance plots 1110, 1120, and 1130 for with and without power rebalancing step in the measurement shown in FIG. 10. In plot 1110, when power rebalancing is applied, the initial ~4-dB power budget difference among the sub-channels is mitigated and the overall BER is improved. Plot 1120 shows the BER performance with and without 80-km fiber transmission, where no significant fiber-transmission penalty is observed for different ONU and sub-channels. Plot 1130 shows the BER performance with and without burst operation, where burst receiving results in no power penalty. Because of the guard time between bursts, the average received power is slightly reduced, leading to a small shift of the curves. The BER curve of the 100-Gbit/s downlink transmission is provided as a reference. When considering the case of four TFDM sub-channels from two ONUs with aggregated 100-Gbit/s data rate, the receiver sensitivity is around −39.2-dBm at 4.5E-3 BER threshold with no significant degradation compared with 100-Gbit/s single-carrier downlink.

In summary, coherent burst receiving technologies for TFDM uplink transmission in 100G CPON are described. Embodiments disclosed include a power control system that includes pre-equalization and power rebalancing and a frequency control system that includes sub-channel recognition and frequency-window calibration are detailed. Using these systems, a TFDM coherent burst receiver may achieve 2.4-GHz frequency detuning tolerance and −39.2-dBm sensitivity under 80-km uplink transmission with four sub-channels.

Changes may be made in the above methods and systems without departing from the scope hereof. It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall therebetween.

What is claimed is:

1. A method for extracting a plurality of data streams from a time-frequency division multiplexed (TFDM) signal, comprising:
    determining a plurality of sub-channels of the TFDM signal, each of the plurality of sub-channels having a respective one of a plurality of frequency ranges;
    down-converting, based on the plurality of frequency ranges, the TFDM signal into a plurality of down-converted signals, each down-converted signal corresponding to a respective one of the plurality of sub-channels; and
    extracting the plurality of data streams from a respective one of the plurality of down-converted signals.

2. The method of claim 1, said step of determining including:
    determining sub-channel boundaries in a frequency spectrum of the TFDM signal; and
    identifying, based on the sub-channel boundaries, the plurality of sub-channels.

3. The method of claim 2, said step of determining sub-channel boundaries including:
    composing, based on (i) the frequency spectrum or a frequency spectrum derived therefrom, and (ii) a pre-determined threshold, a binary sub-channel distribution; and
    determining, based at least on abrupt changes in the binary sub-channel distribution, the sub-channels boundaries.

4. The method of claim 3, further comprising:
    smoothing the frequency spectrum; and
    composing comprising composing, based on the smoothed frequency spectrum and a predetermined threshold, a binary sub-channel distribution.

5. The method of claim 1, said step of extracting including:
    determining a start and an end of a burst in each of the plurality of down-converted signals; and
    extracting a temporal segment of a data stream of the plurality of data streams between the start and the end of the burst.

6. The method of claim 1, further comprising a pre-equalizing of the TFDM signal, including:
    calculating, for each of the plurality of sub-channels, a respective one of a plurality of sub-channel powers;
    equalizing, within each of the plurality of frequency ranges, a power level of a respective one of the plurality of sub-channels; and
    equalizing, based at least on the plurality of sub-channel powers, a power level of all of the plurality of sub-channels.

7. The method of claim 6, said equalizing within the frequency range utilizing constant modulus algorithm.

8. The method of claim 1, the TFDM signal having a 100 gigabits/second data rate.

9. The method of claim 8, the TFDM signal comprising four sub-channels, each sub-channel having a 25 gigabits/second date rate.

10. A burst receiver, comprising:
    a coherent receiver that receives a time-frequency division multiplexed (TFDM) signal;
    a processor communicatively coupled to the coherent receiver; and
    a memory storing computer-readable instructions that, when executed by the processor, cause the processor to extract a plurality of data streams from the TFDM signal by:
        determining a plurality of sub-channels of the TFDM signal, each of the plurality of sub-channels having a respective one of a plurality of frequency ranges;
        down-converting, based on the plurality of frequency ranges, the TFDM signal into a plurality of down-converted signals, each down-converted signal corresponding to a respective one of the plurality of sub-channels; and
        extracting the plurality of data streams from a respective one of the plurality of down-converted signals.

11. The burst receiver of claim 10, the memory further storing computer-readable instructions that, when executed by the processor to determine the plurality of sub-channels, further cause the processor to:
    determine sub-channel boundaries in a frequency spectrum of the TFDM signal; and
    identify, based on the sub-channel boundaries, the plurality of sub-channels.

12. The burst receiver of claim 11, the memory further storing computer-readable instructions that, when executed by the processor to determine the sub-channel boundaries, further cause the processor to:
    compose, based on (i) the frequency spectrum or a frequency spectrum derived therefrom, and (ii) a predetermined threshold, a binary sub-channel distribution; and
    determine, based at least on abrupt changes in the binary sub-channel distribution, the sub-channels boundaries.

13. The burst receiver of claim 12, the memory further storing computer-readable instructions that, when executed by the processor, further cause the processor to:
    smooth the frequency spectrum; and
    compose, based on the smoothed frequency spectrum and a pre-determined threshold, a binary sub-channel distribution.

14. The burst receiver of claim 10, the memory further storing computer-readable instructions that, when executed by the processor to extract the plurality of data streams, further cause the processor to:
    determine a start and an end of a burst in each of the plurality of down-converted signals; and
    extract a temporal segment of a data stream of the plurality of data streams between the start and the end of the burst.

15. The burst receiver of claim 10, the TFDM signal having a 100 gigabits/second data rate.

16. The burst receiver of claim 10, the TFDM signal comprising four sub-channels, each sub-channel having a 25 gigabits/second date rate.

17. A system of coherent passive optical network, comprising:
   an optical line terminal including the burst receiver of claim 10; and
   an optical network unit (ONU) communicably coupled to the burst receiver;
   the ONU mapping a data stream to each of the plurality of sub-channels in the TFDM signal.

18. The system of claim 17, the memory further storing computer-readable instructions that, when executed by the processor, further cause the processor to:
   calculate, for each of the plurality of sub-channels, a respective one of a plurality of sub-channel powers; and
   transmit a downlink signal that includes the plurality of sub-channel powers to the ONU.

19. The system of claim 18, the ONU further including:
   an ONU processor; and
   an ONU memory storing computer-readable instructions that, when executed by the ONU processor, cause the ONU processor to:
     extract the plurality of sub-channel powers from the downlink signal;
     equalize, within each of the plurality of the frequency ranges, a power level of a respective one of the plurality of sub-channels; and
     equalize, based at least on the plurality of sub-channel powers, a power level of all of the plurality of sub-channels.

\* \* \* \* \*